(12) United States Patent
Okuyama et al.

(10) Patent No.: US 10,186,715 B2
(45) Date of Patent: Jan. 22, 2019

(54) SINGLE CELL WITH METAL PLATE, FUEL CELL STACK, AND METHOD FOR PRODUCING SINGLE CELL WITH METAL PLATE

(71) Applicant: NGK SPARK PLUG CO., LTD., Nagoya-shi, Aichi (JP)

(72) Inventors: Yasuo Okuyama, Kasugai (JP); Makoto Kuribayashi, Ichinomiya (JP); Etsuya Ikeda, Kasugai (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 18 days.

(21) Appl. No.: 15/101,063

(22) PCT Filed: Dec. 17, 2014

(86) PCT No.: PCT/JP2014/083395
§ 371 (c)(1),
(2) Date: Jun. 2, 2016

(87) PCT Pub. No.: WO2015/093523
PCT Pub. Date: Jun. 25, 2015

(65) Prior Publication Data
US 2016/0359175 A1 Dec. 8, 2016

(30) Foreign Application Priority Data
Dec. 20, 2013 (JP) ................. 2013-264204

(51) Int. Cl.
*H01M 4/64* (2006.01)
*H01M 4/66* (2006.01)
(Continued)

(52) U.S. Cl.
CPC ....... *H01M 8/0206* (2013.01); *H01M 8/0228* (2013.01); *H01M 8/0273* (2013.01);
(Continued)

(58) Field of Classification Search
CPC ........ H01M 8/0271; H01M 8/10; H01M 8/24; H01M 8/0273; H01M 8/0276; H01M 8/028; H01M 8/0286
See application file for complete search history.

(56) References Cited

U.S. PATENT DOCUMENTS 5,338,623 A * 8/1994 Nachlas ............... B01D 53/326
429/454
6,294,277 B1 * 9/2001 Ueno ................ H01M 8/04029
429/413
(Continued)

FOREIGN PATENT DOCUMENTS

JP  2007-200568 A  8/2007
JP  2007-331026 A  12/2007
(Continued)

OTHER PUBLICATIONS

International Search Report of PCT/JP2014/083395 dated Mar. 3, 2015.
(Continued)

*Primary Examiner* — Olatunji A Godo
*Assistant Examiner* — Julian Anthony
(74) *Attorney, Agent, or Firm* — Sughrue Mion, PLLC

(57) ABSTRACT

A metal plate-bonded single fuel cell unit according to one aspect of the present invention includes a single cell element having a solid electrolyte and fuel and air electrodes disposed on opposite sides of the solid electrolyte and a metal plate bonded by a brazing material to the single cell element. The metal plate contains Ti and Al and has an Al—Ti-containing oxide layer present on a surface of the metal plate, an Al oxide film present on a surface of the Al—Ti-containing oxide layer and a Ti-containing phase apart from a part of a surface of the Al oxide film in contact with the brazing material while being present on a remaining part of the surface of the Al oxide film. The metal plate-bonded
(Continued)

single fuel cell unit has a Ti reaction phase formed at an interface between the solid electrolyte and the brazing material.

5 Claims, 14 Drawing Sheets

(51) Int. Cl.
| | |
|---|---|
| *H01M 2/38* | (2006.01) |
| *H01M 2/40* | (2006.01) |
| *H01M 8/24* | (2016.01) |
| *H01M 8/0206* | (2016.01) |
| *H01M 8/241* | (2016.01) |
| *H01M 8/0273* | (2016.01) |
| *H01M 8/1213* | (2016.01) |
| *H01M 8/0228* | (2016.01) |
| *H01M 8/0297* | (2016.01) |
| *H01M 8/2432* | (2016.01) |
| *H01M 8/124* | (2016.01) |

(52) U.S. Cl.
CPC ....... *H01M 8/0297* (2013.01); *H01M 8/1213* (2013.01); *H01M 8/241* (2013.01); *H01M 8/2432* (2016.02); *H01M 2008/1293* (2013.01)

(56) References Cited

U.S. PATENT DOCUMENTS

| | | | |
|---|---|---|---|
| 7,270,906 B2 * | 9/2007 | Haltiner, Jr. ........ | H01M 8/2425 |
| | | | 429/463 |
| 2003/0132270 A1 | 7/2003 | Weil et al. | |
| 2008/0131723 A1 | 6/2008 | Tucker et al. | |
| 2008/0220313 A1 | 9/2008 | Zerfass et al. | |
| 2008/0305356 A1* | 12/2008 | Weil ..................... | C04B 37/006 |
| | | | 428/640 |
| 2014/0030632 A1* | 1/2014 | Larsen ................. | H01M 8/021 |
| | | | 429/507 |

FOREIGN PATENT DOCUMENTS

| | | |
|---|---|---|
| JP | 2010-021038 A | 1/2010 |
| JP | 4486820 B2 | 6/2010 |
| JP | 2011-162863 A | 8/2011 |
| JP | 2011-179063 A | 9/2011 |
| WO | 2012/143118 A1 | 10/2012 |

OTHER PUBLICATIONS

Communication dated Jul. 17, 2017 from the European Patent Office in counterpart European application No. 14871180.7.
Communication dated Jan. 10, 2018, issued by the Chinese Patent Office in counterpart application No. 201480069839.9.
Communication dated Mar. 30, 2018, issued by the Korean Patent Office in counterpart application No. 10-2016-7016172; 16 pages including translation.

* cited by examiner

SINGLE CELL WITH METAL PLATE, FUEL CELL STACK, AND METHOD FOR PRODUCING SINGLE CELL WITH METAL PLATE

CROSS REFERENCE TO RELATED APPLICATION

This application is a National Stage of International Application No. PCT/JP2014/083395 filed Dec. 17, 2014, claiming priority based on Japanese Patent Application No. 2013-264204 filed Dec. 20, 2013, the contents of all of which are incorporated herein by reference in their entirety.

FIELD OF THE INVENTION

The present invention relates to a metal plate-bonded single fuel cell unit having a solid electrolyte, a fuel electrode, an air electrode and a metal plate, a fuel cell stack having a plurality of metal plate-bonded single fuel cell units and a method for producing a metal plate-bonded single fuel cell unit.

BACKGROUND ART

As a fuel cell, there is conventionally known a solid oxide type fuel cell (hereinafter sometimes abbreviated as "SOFC") using a solid electrolyte (solid oxide).

One known use of SOFC is as a fuel cell stack having stacked therein a plurality of single cell elements, each including a plate-shaped solid electrolyte, a fuel electrode disposed on one side of the solid electrolyte and an air electrode disposed on the other side of the solid electrolyte.

The SOFC is so configured as to generate electrical power by supplying fuel gas and air to the fuel electrode and the air electrode, respectively, and causing chemical reaction of the fuel and oxygen in the air through the solid electrolyte.

In some cases, a plate-shaped separator made of metal such as stainless steel (called "metal separator") is used in the SOFC so as to separate a flow path of fuel gas (i.e. fuel flow path) and a flow path of air (i.e. air flow path) from each other. It has been known to use separator-bonded single cell units in which, when viewed in plan, rectangular frame-shaped metal separators are integrally bonded by brazing around peripheries of rectangular single cell elements.

Further, Patent Document 1 discloses a technique of bonding a surface-aluminized metal member to a ceramic member with the use of a brazing material having a mixed composition of a metal oxide such as Ag—CuO, Ag—$V_2O_5$ or Pt—$Nb_2O_5$ and a noble metal as a seal material.

Patent Document 2 discloses a technique of brazing a metal member to a ceramic member with the use of a Ti-doped Ag brazing material.

PRIOR ART DOCUMENTS

Patent Documents

Patent Document 1: Japanese Patent No. 4486820
Patent Document 2: Japanese Laid-Open Patent Publication No. 2007-331026

SUMMARY OF THE INVENTION

Problems to be Solved by the Invention

The above-mentioned conventional technology has the following problem and is in need of improvements.

In the above conventional technology, the metal member has a surface coated with an Al oxide film (alumina film). However, the alumina film may be separated from the surface of the metal member during thermal cycles due to the difference in thermal expansion coefficient between the metal member and the alumina film.

In addition, the brazing material is low in wettability against the alumina film and thereby low (weak) in bonding strength to the alumina film on the surface of the metal member.

The brazing material is also low in wettability against the solid electrolyte and low in bonding strength to the solid electrolyte of the single cell element.

In other words, there has conventionally been a problem that the bonding strength between the single cell element and the metal plate is low as a whole.

It is a desirable objective of the present invention to provide a metal plate-bonded single fuel cell unit in which a single fuel cell element and a metal plate are bonded together with high bonding strength. It is also a desirable objective of the present invention to provide a fuel cell stack and a method for producing a metal plate-bonded single fuel cell unit.

Means for Solving the Problems (1) According to a first aspect of the present invention, there is provided a metal plate-bonded single cell unit of a fuel cell, comprising: a single cell element having a solid electrolyte, a fuel electrode disposed on one side of the solid electrolyte and an air electrode disposed on the other side of the solid electrolyte; and a metal plate bonded by a brazing material to the single cell element so as to be in contact with at least the solid electrolyte, wherein the metal plate contains Ti and Al and has an Al—Ti-containing oxide layer present on a surface of the metal plate, an Al oxide film present on a surface of the Al—Ti-containing oxide layer and a Ti-containing phase apart from a part of a surface of the Al oxide film in contact with the brazing material while being present on a remaining part of the surface of the Al oxide film; and wherein the metal plate-bonded single cell unit has a Ti reaction phase formed at an interface between the solid electrolyte and the brazing material.

In the first aspect, the single cell unit of the fuel cell (e.g. solid oxide type fuel cell) is provided with the Ti—Al-containing metal plate.

The Al—Ti-containing oxide layer (which has a thermal expansion coefficient between thermal expansion coefficients of the metal plate and the Al oxide film) is present between the metal plate and the Al oxide film so as to function as a thermal expansion buffer layer. It is thus possible to improve the interface adhesion strength (bonding strength) between the metal plate and the Al oxide film.

Further, the Ti-containing phase is present on the surface (outer side) of the Al oxide film so as to improve the wettability of the brazing material during brazing. It is thus possible to improve the bonding strength between the Al oxide film and the brazing material.

As the Ti-containing phase is present on the outer side of the Al oxide film, Ti in the Ti-containing phase is diffused to the brazing material and then to the solid electrolyte during the brazing of the metal plate to the single cell element. By the diffusion of Ti, the Ti reaction phase is formed on a surface of the solid electrolyte. Simultaneously, a constituent (such as Ag) of the brazing material is diffused to and embedded in the solid electrolyte. It is thus possible to improve the bonding strength between the brazing material and the solid electrolyte.

By the diffusion of Ti into the brazing material during the brazing, a part of the Ti-containing phase present at the interface between the Al oxide film and the brazing material disappears. Although it is known that Ti is readily susceptible to changes by exposure to an oxidizing or reducing atmosphere, such Ti disappears from between the Al oxide film and the brazing material so as to allow improvement in the bonding strength between the Al oxide film and the brazing material.

In the case where the Ti reaction phase between the brazing material and the solid electrolyte is 10 to 500 nm, the influence of changes of Ti by oxidization or reduction is small. In addition, the constituent of the brazing material is embedded in the solid electrolyte as mentioned above. It is possible in this case to effectively maintain the high bonding strength.

For the high bonding strength, it is preferable that the Ti reaction phase does not form a layer at the interface between the brazing material and the solid electrolyte so that, even when Ti is changed by oxidization or reduction, the influence of such changes of Ti is small.

By the above configuration, the metal plate-bonded single cell unit attains a significant effect in improving the overall bonding strength between the metal plate and the single cell element.

Hereinafter, the respective structural components will be explained below in detail.

The Ti—Al-containing metal plate is made of, for example, stainless steel containing Fe as a main component. The metal plate can have a Ti content of 0.05 to 1 mass % and an Al content of 2 to 10 mass %.

If the Ti content of the metal plate is less than 0.05 mass %, the metal plate may not allow sufficient improvement in the wettability of the brazing material. If the Ti content of the metal plate exceeds 1 mass %, the metal plate may deteriorate in oxidation resistance. If the Al content of the metal plate is less than 2 mass %, it is unlikely that the Al oxide film will be formed. If the Al content of the metal plate exceeds 10 mass %, the metal plate may become too high in hardness and thereby become easy to break and difficult to process.

The Al—Ti-containing oxide layer refers to an oxide film formed of a composite phase e.g. in which Ti is scattered in an oxide layer of $Al_2O_3$ (alumina).

The Al oxide layer refers to e.g. an oxide film made of alumina.

The Ti-containing phase refers to e.g. an oxide phase of Ti diffused from the metal plate to the outer side of the Al oxide film.

The Ti reaction phase refers to a crystalline phase formed by reaction of Ti and the solid electrolyte and, more specifically, a composite oxide phase formed by reaction of a constituent element of the solid electrolyte, such as Sr, Ca, Y, Sc, Gd or Sm, with Ti.

(2) According to a second aspect of the present invention, there is provided a metal plate-bonded single cell unit as described above, wherein the metal plate serves as a separator to separate a space around the fuel electrode from a space around the air electrode.

In the second aspect, the metal separator is embodied as the separator (metal separator) so as to separate the fuel electrode side and the air electrode side from each other.

(3) According to a third aspect of the present invention, there is provided a metal plate-bonded single cell unit as described above, wherein the brazing material contains at least one kind selected from the group consisting of Ag, Au, Pd and Pt.

In the third aspect, the brazing material contains at least one of Ag, Au, Pd and Pt (e.g. as a main component). In this case, it is advantageous in that the brazing material is less likely to be oxidized and corroded even when the brazing is performed in the air.

Examples of the brazing material are: mixtures of Ag and oxides, such as Ag—CuO, Ag—$Cr_2O_3$, Ag—$Al_2O_3$ and Al—$SiO_2$; and alloys of Ag and other metals, such as Ag—Ge—Cr, Ag—Al and Ag—In.

(4) According to a fourth aspect of the present invention, there is provided a fuel cell stack having a plurality of the metal plate-bonded single cell units according to any one of the first to third aspects of the present invention.

In the fourth aspect, the metal plate-bonded single cell units of the above-mentioned type is used in the fuel cell stack (e.g. solid oxide type fuel cell stack). It is thus possible to effectively ensure high bonding strength between the metal plates and the single cell elements and impart high product durability to the fuel cell stack.

(5) According to a fifth aspect of the present invention, there is provided a method for producing a metal plate-bonded single cell unit according to any one of the first to third aspects of the present invention, comprising:

bonding the metal plate to the single cell element by the brazing material; and before the bonding, heat-treating the metal plate in a temperature range of 900° C. to 1200° C.

In the fifth aspect, the Ti—Al-containing metal plate is heat-treated at a predetermined temperature in an oxygen atmosphere (e.g. in the air) before the brazing.

During the heat treatment, there are formed the Al—Ti-containing oxide layer on the surface of the metal plate, the Al oxide film on the surface of the Al—Ti-containing oxide layer and the Ti-containing phase on the surface of the Al oxide film as in the first aspect.

By forming such a surface structure on the metal plate, it is possible to effectively produce the metal plate-bonded single cell unit with high bonding strength between the metal plate and the single cell element.

If the heat treatment temperature is lower than 900° C., it is unlikely that the Ti-containing phase will be formed on the surface of the Al oxide film. In order to form the Ti-containing phase to a certain degree or more on the surface of the Al oxide film, the heat treatment temperature is more preferably 950° C. or higher. If the heat treatment temperature exceeds 1200° C., Ti is excessively present to form a layer in the Al—Ti-containing oxide layer so that separation is likely to occur at the excessive Ti layer.

Although the brazing can be performed e.g. in the air by heating at e.g. 800° C. to 1200° C., it is feasible to appropriately set the brazing temperature depending on the melting temperature of the brazing material.

DESCRIPTION OF REFERENCE NUMERALS

Figure 1:
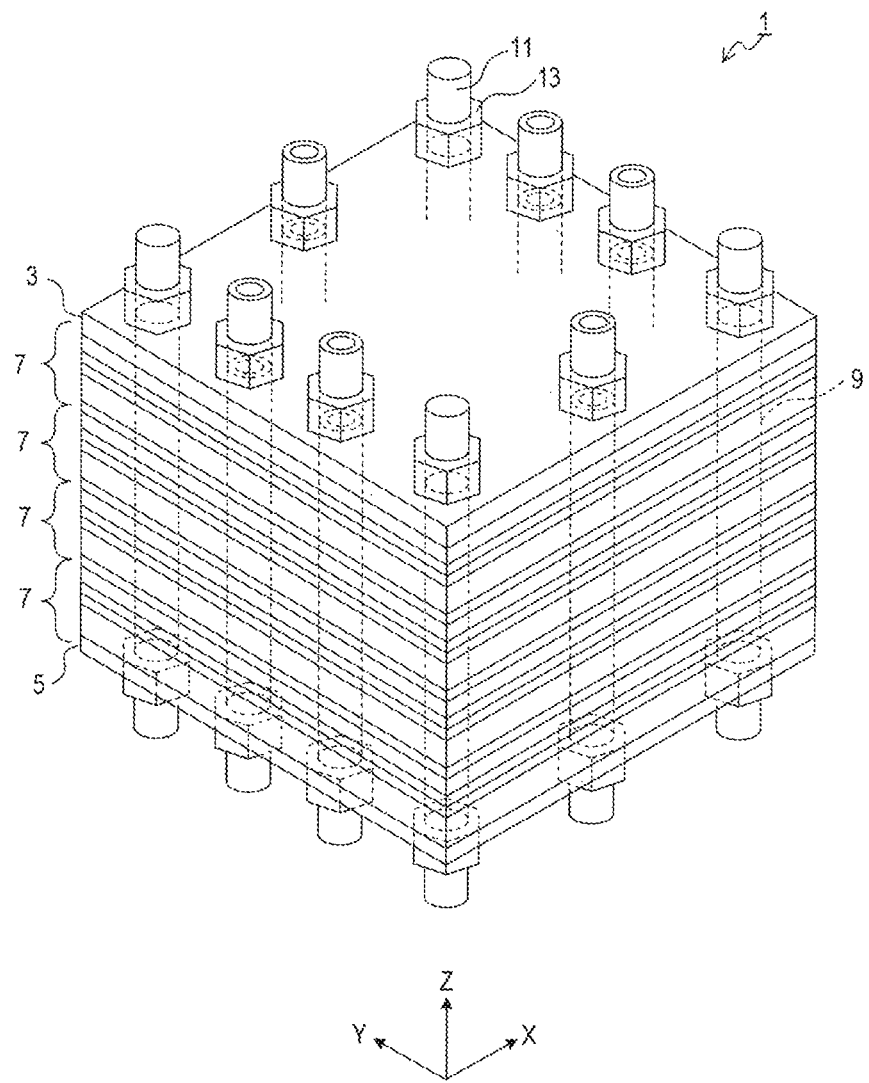
FIG. 1 is a perspective view of a fuel cell stack according to a first embodiment of the present invention.

1: Fuel cell stack
7: Fuel cell
21, 87, 107, X7: Solid electrolyte layer
23: Fuel electrode layer
25: Air electrode layer
27, 83, 103: Single cell element
41: Metal separator
51, 85, 105, X5: Bonding part
53, 81, 101: Metal plate-bonded single cell unit
55: Substrate part
57: Surface structure
59, X2: Al—Ti-containing oxide layer
61, X3: Al oxide film
63, X4: Ti-containing phase
67, 91, 111, X6: Ti reaction phase
69: Brazing material layer

DESCRIPTION OF EMBODIMENTS

Exemplary embodiments (examples) of the present invention, which refer to a metal plate-bonded single fuel cell unit, a fuel cell stack having a plurality of metal plate-bonded single fuel cell units and a method for producing a metal plate-bonded single fuel cell unit, will be described below.

First Embodiment a) First, a solid oxide type fuel cell stack with solid oxide type single fuel cells according to the first embodiment of the present invention will be explained below. The wording "solid oxide type" will be hereinafter omitted for simplification purposes.

Figure 2:
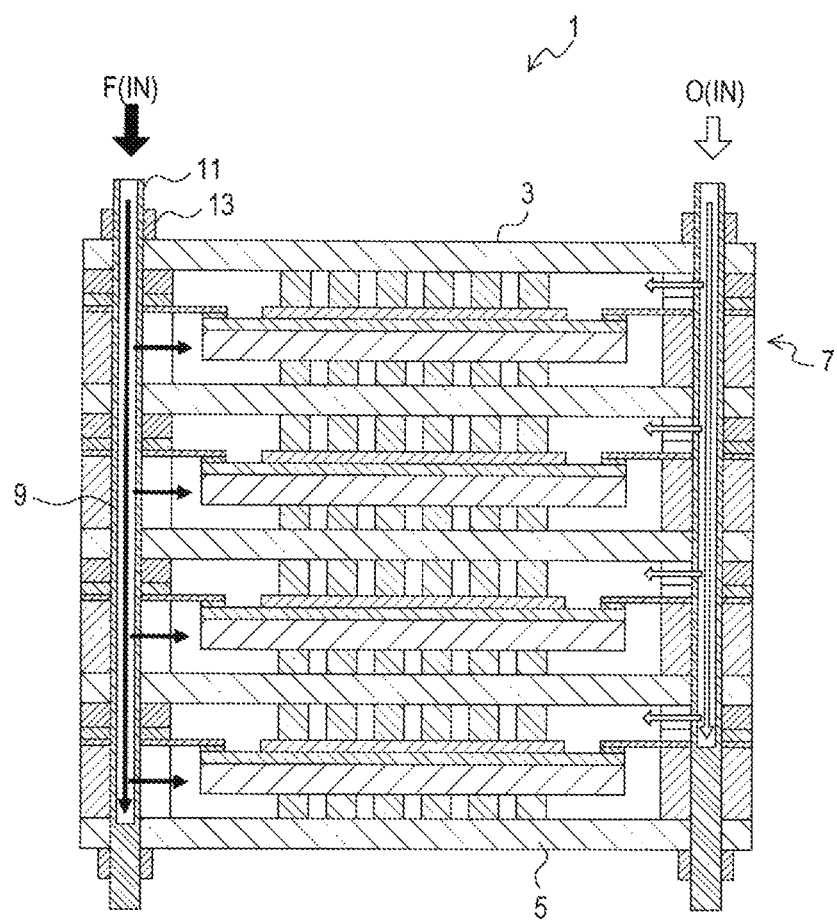
FIG. 2 is a schematic section view of the fuel cell stack, taken in a stacking direction thereof, according to the first embodiment of the present invention.

As shown in FIGS. 1 and 2, the fuel cell stack 1 is adapted as a device for generating electrical power by supply of fuel gas (such as hydrogen: F) and oxidant gas (such as air (more specifically, oxygen in the air): O). In the following explanation, top and bottom sides of FIG. 1 are referred to as upper and lower sides of the fuel cell stack 1, respectively.

The fuel cell stack 7 includes a pair of end plates 3 and 5 arranged on upper and lower ends thereof and a plurality of fuel cells 7 stacked together between the end plates 3 and 5. A plurality of (e.g. ten) through holes 9 are formed through the end plates 3 and 5 and the fuel cells 7 in a stacking direction (vertical direction in FIG. 1) of the fuel cell stack so that that the end plates 3 and the fuel cells 7 are integrally fixed together by inserting bolts 11 in the respective through holes 9 and screwing nuts 13 onto the respective bolts 11.

For simplification purposes, the following explanation will be given on the assumption that the fuel cell stack 1 includes four fuel cells 7 stacked together.

The end plates 3 and 5 serve as not only retaining plates to press and retain the stacked fuel cells 7 therebetween but also output terminals to output current from the fuel cells 7. On the other hand, the fuel cells 7 serve as power generation parts to generate electrical power by supply of fuel gas and air as will be explained below.

b) Next, the configuration of the fuel cells 7 will be explained below in detail.

Figure 3:
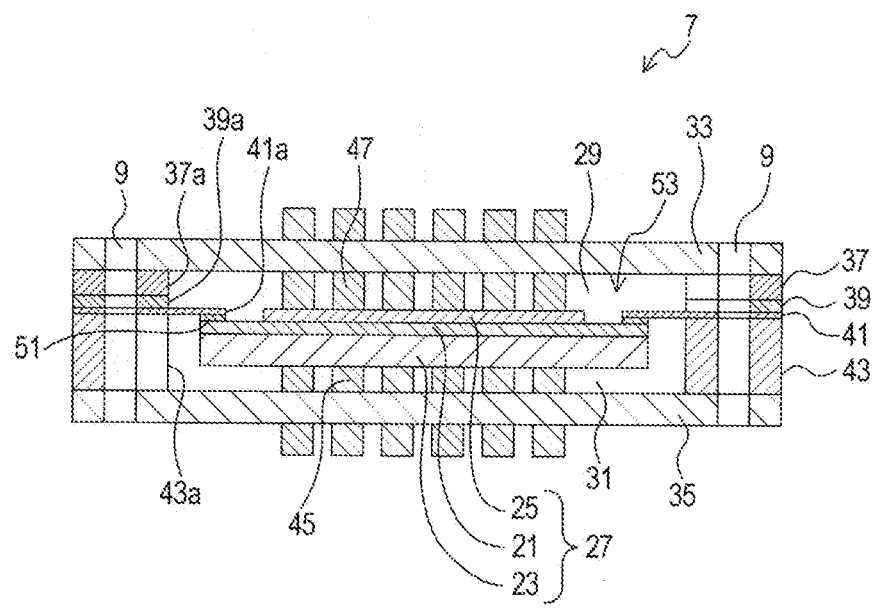
FIG. 3 is a schematic section view of a fuel cell of the fuel cell stack, taken in the stacking direction, according to the first embodiment of the present invention.

As shown in FIG. 3, the fuel cells 7 are configured as so-called fuel electrode supporting film type fuel cells.

Each of the fuel cells 7 has a film-shaped solid electrolyte layer 21, a fuel electrode layer 23 (as an anode) disposed on one side (bottom side of FIG. 3; hereinafter referred to "lower side") of the solid electrolyte layer and a film-shaped air electrode layer 25 (as a cathode) disposed on the other side (top side of FIG. 3; hereinafter referred to "upper side") of the solid electrolyte layer. The solid electrolyte layer 21, the fuel electrode layer 23 and the air electrode layer 25 function together as a single cell element 27. An air flow passage 29 is provided on an air electrode layer 25 side of the single cell element 27, whereas a fuel flow passage 31 is provided on a fuel electrode layer 23 side of the single cell element 27.

Each of the fuel cells 7 has, in addition to the single cell element 27, a pair of upper and lower interconnectors 33 and 35, a frame-shaped air electrode frame 37 arranged on the air electrode layer 25 side of the single cell element, an insulating frame 39 arranged on the air electrode layer 25 side of the single cell element, a frame-shaped metal separator 41 bonded to an outer peripheral portion of an upper surface of the single cell element 27 so as to interrupt the air flow passage 29 and the fuel flow passage 31 and a frame-shaped fuel electrode frame 43 arranged on the fuel electrode layer 23 side of the single cell element. These components are stacked and integrated into one.

The through holes 9 are, when viewed in plan, formed in rectangular frame-shaped outer peripheral regions of the fuel cells 7 for insertion of the bolts 11. Herein, the wording "viewed in plan" means "viewed in the stacking direction" (the same applies to the following).

The respective cell components will be explained below.

The air electrode layer 25 is made of, for example, perovskite oxide (such as LSCF (lanthanum strontium cobalt iron oxide) or LSM (lanthanum strontium manganese oxide)).

The solid electrolyte layer 21 is made of, for example, YSZ (yttria-stabilized zirconia), ScSZ (Scandia-stabilized zirconia), LSGM (Lanthanum strontium magnesium gallate), SDC (samaria-doped ceria), GDC (gadolinium-doped ceria) or perovskite oxide.

The fuel electrode layer 23 is preferably made of a metal material such as Ni, a cermet of Ni and ceramic material or a Ni-based alloy.

The interconnectors 33 and 35 are used to secure electrical conduction between the single cell elements 27 while preventing gas mixing between the single cell elements 27. Each of the interconnectors 33 and 35 is made of a conductive plate material (e.g. metal plate of stainless steel).

Fuel-electrode-side collectors 45 are integrally provided on upper sides of the interconnectors 33 and 35 and brought into contact with the fuel electrode layers 23; and air-electrode-side collectors 47 are integrally provided on lower sides of the interconnectors 33 and 35 and brought into contact with the air electrode layers 25.

The air electrode frame 37 is made of a metal material in a rectangular frame shape with an opening 37 formed in the center thereof as a part of the air flow passage 29. There can be used, for example, stainless steel as the material of the air electrode frame 37.

The insulating frame 39 is used to establish insulation between the interconnectors 33 and 35 and is rectangular-frame shaped with an opening 39a formed in the center thereof as a part of the air flow passage 29. As the material of the insulating frame 39, there can be used a ceramic material such as alumina, mica, vermiculite or the like.

The metal separator 41 is made of a heat-resistant metal plate in a rectangular frame shape with an opening 41a formed in the center thereof as will be explained later in detail. The metal separator 41 is bonded to an outer peripheral end portion of the solid electrolyte layer 21 of the single cell element 27 via a bonding part 51 so as to separate the air flow passage 29 and the fuel flow passage 31 from each other and thereby prevent mixing of the air and the fuel gas. The single cell element 27 to which the metal separator 41 has been bonded is hereinafter referred to as a metal plate-bonded single cell unit 53.

The fuel electrode frame 43 is made of an insulating material in a rectangular frame shape with an opening 43a formed in the center thereof as a part of the fuel flow passage 31. As the material of the fuel electrode frame 43, there can be used the same material as those used for the insulating frame 39.

c) Next, the configuration of the metal plate-bonded single cell unit 53 as characteristic features of the first embodiment will be explained below.

Figure 4:
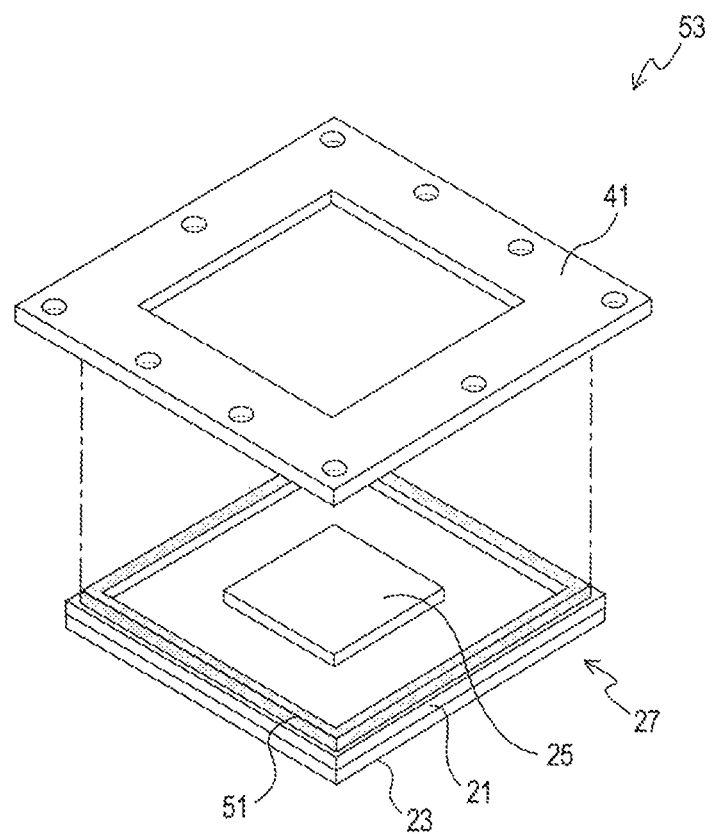
FIG. 4 is a perspective exploded view of a metal plate-bonded single cell unit of the fuel cell according to the first embodiment of the present invention.
Figure 5:
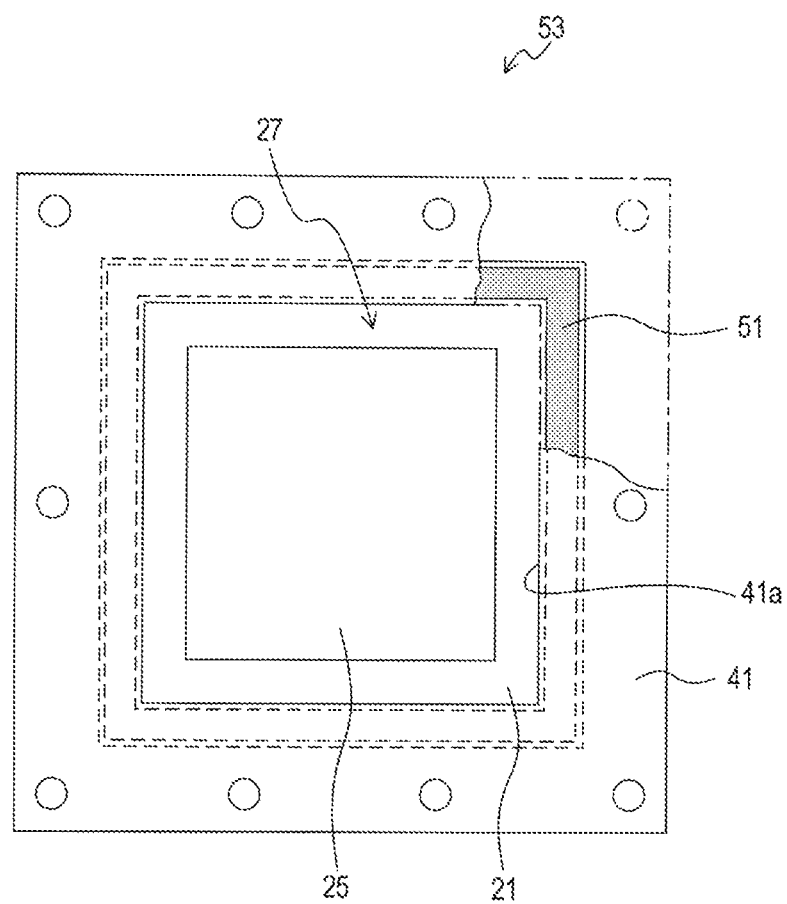
FIG. 5 is a top view, partially in section, of the metal plate-bonded single cell unit according to the first embodiment of the present invention.

In the metal plate-bonded single cell unit 53, the metal separator 41 and the single cell element 27 are arranged such that the centers of areas, that is, figure centroids of the metal separator 41 and the single cell element 27 coincide with each other and such that vertical and horizontal sides of the metal separator 41 are aligned in parallel with vertical and horizontal sides of the single cell element 27, and then, integrally bonded together via the bonding part 51 as shown in FIGS. 4 and 5.

The outer dimensions of the metal separator 41 (as viewed in plan) are 180 mm in longitudinal length, 180 mm in lateral length and 30 mm in width. On the other side, the outer dimensions of the single cell element 27 (as viewed in plan) are 120 mm in longitudinal length and 120 mm in lateral length.

The metal separator 41 is thin plate-shaped with a thickness of 0.02 to 0.5 mm (e.g. 0.1 mm). It is feasible to use, for example, 18Cr—Al—Ti stainless steel as the material of the metal separator 41. The material of the metal separator 41 can have an Al content of 2 to 10 mass % and a Ti content of 0.05 to 1 mass %.

The bonding part 51 is made of a brazing material in a rectangular frame shape between an inner peripheral portion of a lower surface (back side in FIG. 5) of the metal separator 41 along the opening 41a and the outer peripheral portion of the upper surface of the single cell element 27. The outer dimensions of the bonding part 51 (as viewed in plan) are 120 mm in longitudinal length, 120 mm in lateral length, 3 mm in width and 10 to 80 μm in thickness.

There may be a slight gap (e.g. of about 0.05 to 1.5 mm) left between an inner periphery of the bonding part 51 and an inner periphery of the opening 41a. Further, there may be a slight gap (e.g. of about 0.05 to 1.5 mm) left between an outer periphery of the bonding part 51 and an outer periphery of the single cell element 27.

As the brazing material of the bonding part 51, there can be used various brazing materials less likely to be oxidized and corroded even during air brazing, such as those containing at least one kind selected from the group consisting of Ag, Au, Pd and Pt.

Specific examples of the brazing material are Ag-based brazing materials as typified by: mixtures of Ag and oxides, such as Ag—$Ag_2O_3$, Ag—CuO, Ag—$Cr_2O_3$ and Ag—$SiO_2$; and alloys of Ag and other metals, such as Ag—Ge—Cr and Ag—Al.

Figure 6:
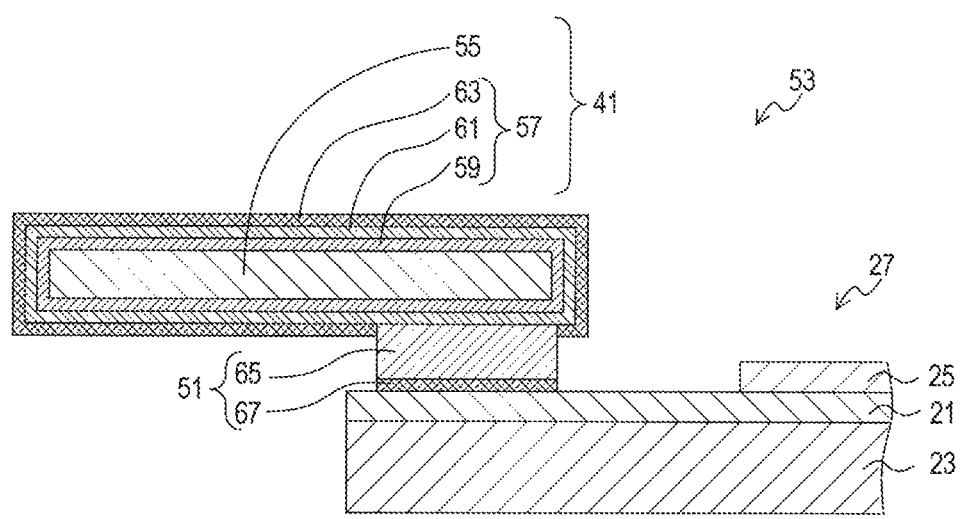
FIG. 6 is an enlarged section view of a bonding part and its vicinity of the metal plate-bonded single cell unit, taken in the stacking direction, according to the first embodiment of the present invention.

In particular, the metal plate-bonded single cell unit 53 is structured as shown in FIG. 6 in the first embodiment.

More specifically, the metal separator 41 include a substrate part 55 located in the center thereof as a base of the metal separator 14 and a surface structure 57 covering a surface of the substrate part 55.

The substrate part 55 has a plate shape with a thickness of 0.02 to 0.5 mm and contains not only Fe as a mail component but also Al and Ti. The surface structure 57 includes an Al—Ti-containing oxide layer 59, an Al oxide film 61 and a Ti-containing phase 63 arranged in this order from the center side.

In the surface structure 57, the oxide layer 59 contains both of Al and Ti. In the first embodiment, the oxide layer 59 is a composite phase in which Ti is scattered in an oxide layer of $Al_2O_3$ (alumina). There is no layer formed by Ti in this phase.

The Al oxide film 61 is an alumina film in which Ti is not contained.

The Ti-containing phase 63 is a phase in which Ti is present in an oxide state or metal state in the form of e.g. particles. Herein, the Ti-containing phase 63 is not present on a part of a surface of the Al oxide film in contact with the brazing material (i.e. the bonding part 51).

The bonding part 51 includes a main bonding portion 65 held in contact with the Al oxide film 61 of the metal separator 41 and a Ti reaction phase 67 held in contact with the solid electrolyte layer 21. The main bonding portion 65 is made of Ag brazing material containing 7.5 vol % of $Al_2O_3$.

The Ti reaction phase 67 is a crystalline phase formed by reaction of Ti and the solid electrolyte material. The Ti reaction phase 67 is 10 to 500 nm (e.g. 200 nm) in thickness.

As mentioned above, the metal separator 41 has the Al—Ti-containing oxide layer 59 present on a surface of the substrate part 55, the Al oxide film 61 present on a surface of the oxide layer 59 and the Ti-containing phase 63 apart from the part of the surface of the Al oxide film 61 in contact with the brazing material while being present on the remaining part of the surface of the Al oxide film 61 in the first embodiment. Further, there is the Ti reaction phase 67 formed at an interface between the solid electrolyte layer 21 and the brazing material in the first embodiment.

d) The production method of the metal plate-bonded single cell unit 53 will be explained below.

As is conventionally known, the single cell element 27 is produced by laminating a green sheet for the formation of the solid electrolyte layer 21 on one side of a green sheet for the formation of the fuel electrode layer 23, firing the resulting laminate, printing a material for the formation of the air electrode layer 25 on the surface of the solid electrolyte layer 21 of the fired laminate and firing the printed laminate.

Figure 7A:
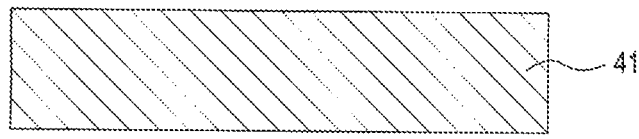
FIGS. 7A to 7C are schematic views showing a production for production of the metal plate-bonded single cell unit according to the first embodiment of the present invention.

On the other hand, the substrate part 55 is produced by cutting a metal plate of e.g. 18Cr—Al—Ti as shown in FIG. 7A.

The substrate part 55 is heated (heat-treated) at 900 to 1200° C. (e.g. 1000° C.) for 1 to 8 hours (e.g. 5 hours) in the air, and then, subjected to natural cooling.

Figure 7B:
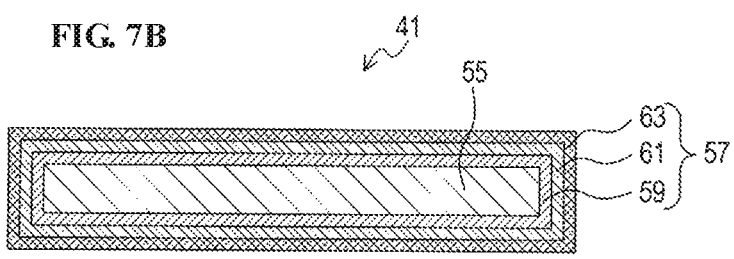

By this heat treatment, the surface structure 57 in which the Al—Ti-containing oxide layer 59, the Al oxide film 61 and the Ti-containing phase 63 are laminated together is formed on the surface of the substrate part 55 as shown in FIG. 7B.

Figure 7C:
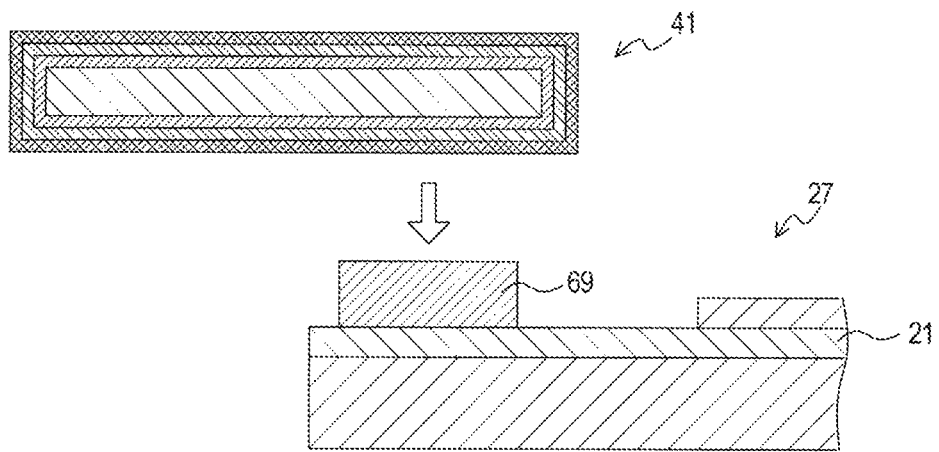
Figure 8:
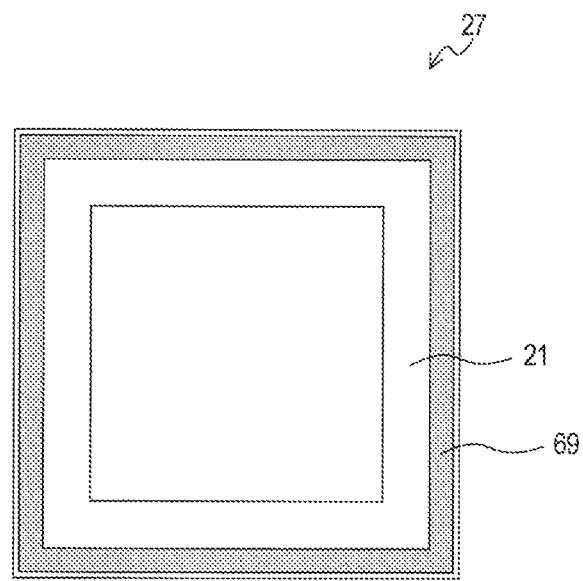
FIG. 8 is a schematic view showing a brazing material layer applied to an upper side of the single cell element of the metal plate-bonded single cell unit according to the first embodiment of the present invention.

Next, a rectangular frame-shaped brazing material layer 69 is subsequently formed as shown in FIG. 7C by screen printing of a paste of e.g. Ag brazing material (containing 8 vol % of $Al_2O_3$) on the outer peripheral end portion (see FIG. 8) of the upper surface of the solid electrolyte layer 21. The outer dimensions of the brazing material layer 69 (as viewed in plan) are 122 mm in longitudinal length, 122 mm in lateral length, 2 to 6 mm (e.g. 4 mm) in width and 10 to 100 μm (e.g. 30 μm) in thickness.

There may be a slight gap (of e.g. 0.05 to 1.5 mm) left between an outer periphery of the brazing material layer 69 and the outer periphery of the single cell element 27.

Subsequently, the metal separator 41 is pressed against the upper side of the brazing material layer 69 on which the brazing material layer has been formed.

The brazing is then performed as follows by heating at a predetermined brazing temperature.

Figure 9:
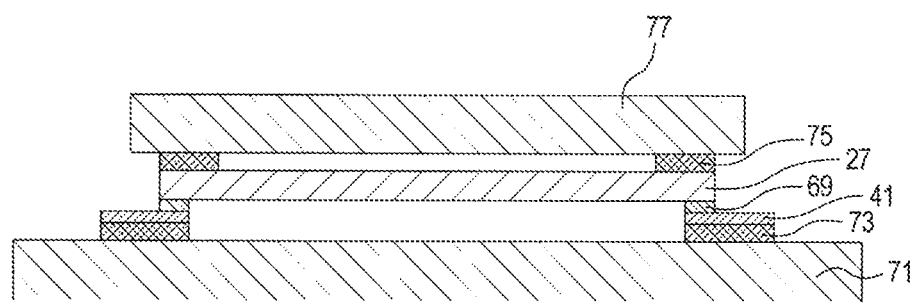
FIG. 9 is a schematic view showing a brazing operation during production of the metal plate-bonded single cell unit according to the first embodiment of the present invention.

As shown FIG. 9, a rectangular frame-shaped heat-resistant cushioning material 73 such as alumina felt is laid over a base stage 71 of e.g. alumina. The metal separator 41 and the single cell element 27 are laminated together (via the brazing material layer 69) on the cushioning material 73 with the metal separator 41 located downward.

A heat-resistant cushioning material 75, which is similar to the above, is laid over the single cell element 27. A weight 77 is put on the cushioning material 75 so as to apply a load of 20 to 500 g/cm$^2$ (2 to 50 kPa) (e.g. 300 g/cm$^2$).

The brazing material is melted by heating at 800 to 1200° C. (e.g. 1000° C.) for 0.1 to 8.0 hours (e.g. 1 hour), and then, solidified by cooling such that the metal plate is brazed to the single cell element.

By such heating for the brazing, Ti in the Ti-containing phase 63 located at the outermost of the metal separator 41 is diffused and migrated to the brazing material. As a result, the Ti-containing phase 63 does not exist (that is, Ti does not exist) on the part of the surface of the metal plate 41 in contact with the bonding part 51. A part of Ti migrated to the brazing material reaches the vicinity of the surface of the solid electrolyte layer 21 and forms the Ti reaction phase 67.

Further, Ag in the brazing material erodes the surface of the solid electrolyte layer 21 and enters into the solid electrolyte layer 21 during the brazing.

In this way, the metal plate-bonded single cell unit 53 is completed as shown in FIG. 6.

e) The effects of the first embodiment will be explained below.

In the first embodiment, the Al—Ti-containing oxide layer 59 (which has a thermal expansion coefficient between thermal expansion coefficients of the substrate part 55 and the Al oxide film 61) is present between the substrate part 55 and the Al oxide film 61 of the metal separator 41 so as to function as a thermal expansion buffer layer. It is thus possible to improve the interface adhesion strength (bonding strength) between the substrate part 55 and the Al oxide film 61.

Herein, the relationship of H1>H2>H3 is satisfied where H1 is the thermal expansion coefficient of the substrate part 55; H2 is the thermal expansion coefficient of the Al—Ti-containing oxide layer 59; and H3 is the thermal expansion coefficient of the Al oxide film 61.

Further, the Ti-containing phase 63 is present on the surface (outer side) of the Al oxide film 61 so as to improve the wettability of the brazing material during brazing. It is thus possible to improve the bonding strength between the Al oxide film 61 and the brazing material.

As the Ti-containing phase 63 is present on the outer side of the Al oxide film 61, Ti in the Ti-containing phase 63 is diffused into the brazing material and to the solid electrolyte layer 21 during brazing of the metal plate 41 to the single cell element 27. By the diffusion of Ti, the Ti reaction phase 67 is formed on the surface of the solid electrolyte layer 21. Simultaneously, a constituent (such as Ag) of the brazing material is diffused to and embedded in the solid electrolyte layer 21. It is thus possible to improve the bonding strength between the brazing material and the solid electrolyte layer 21.

By the diffusion of Ti into the brazing material during the brazing, a part of the Ti-containing phase 63 present at the interface between the Al oxide film 61 and the brazing material disappears. Although it is known that Ti is readily susceptible to changes by exposure to oxidizing or reducing atmosphere, such Ti disappears from between the Al oxide film 61 and the brazing material so as to allow improvement in the bonding strength between the Al oxide film 61 and the brazing material.

By the above configuration, the metal plate-bonded single cell unit attains a significant effect in improving the overall bonding strength between the metal plate 41 and the single cell element 27.

In addition, the brazing material contains at least one of Ag, Au, Pd and Pt (e.g. as a main component) in the first embodiment. It is thus advantageous in that the brazing material is less likely to be oxidized and corroded even when the brazing is performed in the air.

As the fuel cell stack 1 is provided with the above metal-plate bonded single cell units 53, it is possible to effectively ensure high bonding strength between the metal plates 41 and the single cell elements 27 and impart high product durability to the fuel cell stack 1.

The metal plate-bonded single cell unit 53 is produced by, before the brazing of the metal plate to the single cell element, heat-treating the substrate part 55 in the air at 900° C. to 1200° C. It is thus possible to easily form the metal separator 41 with the surface structure 57.

Second Embodiment

The second embodiment of the present invention will be explained below. The same parts of the second embodiment as those of the first embodiment are designated by the same reference numerals; and explanations thereof will be omitted or simplified.

Figure 10:
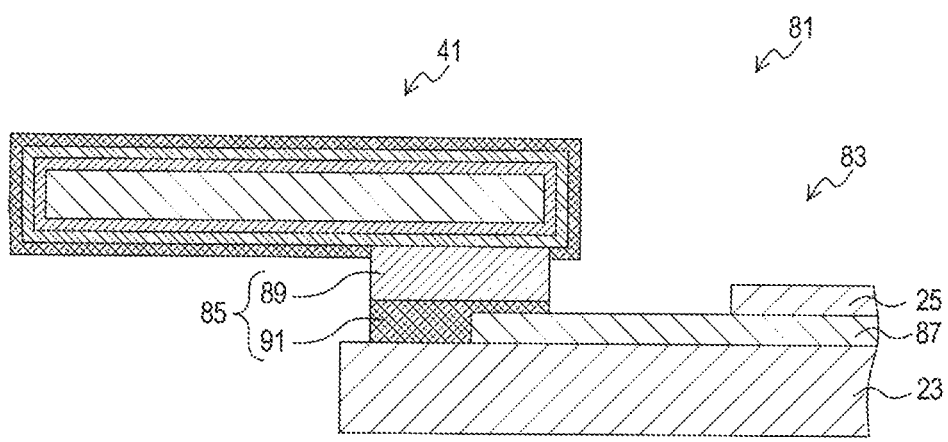
FIG. 10 is an enlarged section view of a bonding part and its vicinity of a metal plate-bonded single cell unit, taken in a stacking direction thereof, according to a second embodiment of the present invention.

As shown in FIG. 10, a metal plate-bonded single cell unit 81 according to the second embodiment includes a metal separator 41 and a single cell element 83 bonded together by a rectangular frame-shaped bonding part 85 made of a brazing material as in the case of the first embodiment.

The single cell element 83 has a solid electrolyte layer 87, a fuel electrode layer 23 and an air electrode layer 25. The solid electrolyte layer 87 is smaller in longitudinal and lateral outer dimensions (as viewed in plan) than that of the first embodiment, whereas the fuel electrode layer 23 and the air electrode layer 25 are similar to those of the first embodiment. Namely, an outer periphery of the solid electrolyte layer 87 is located slightly inside (by a distance of e.g. 0.5 to 4 mm) from an outer periphery of the single cell element 83.

In consequence, a bonding part 85 is formed over outer peripheral end portions of upper surfaces of the fuel electrode layer 23 and the solid electrolyte layer 87 in the second embodiment. The bonding part 85 includes a main bonding portion 89 on an upper side thereof and a Ti reaction phase 91 on a lower side thereof as in the case of the first embodiment. The Ti reaction phase 91 is formed astride the outer peripheral end portions of the fuel electrode layer 23 and the solid electrolyte layer 87.

It is thus possible in the second embodiment to obtain the same effects as in the first embodiment. Further, it is advantageously possible in the second embodiment to improve the bonding strength by the anchor effect of such a brazing material as the brazing is performed on the porous fuel electrode layer 23 so that the brazing material is three-dimensionally anchored into the fuel electrode layer 23.

Third Embodiment

The third embodiment of the present invention will be explained below. The same parts of the third embodiment as those of the first embodiment are designated by the same reference numerals; and explanations thereof will be omitted or simplified.

Figure 11:
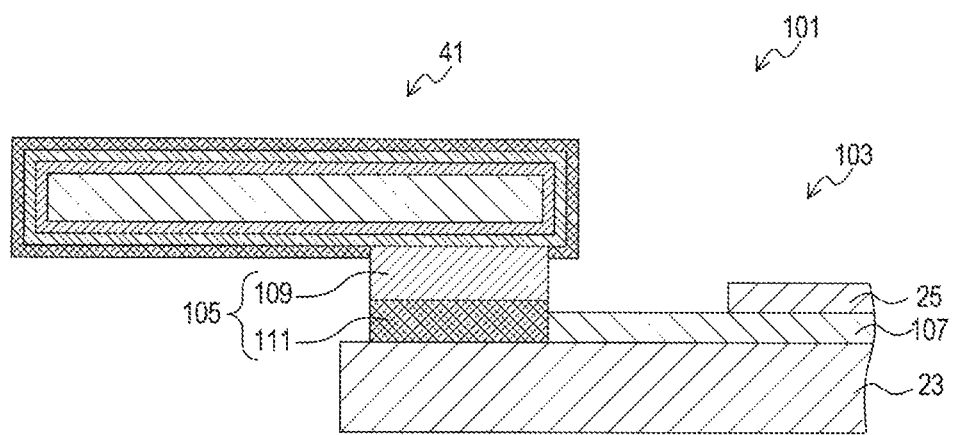
FIG. 11 is an enlarged section view of a bonding part and its vicinity of a metal plate-bonded single cell unit, taken in a stacking direction thereof, according to a third embodiment of the present invention.

As shown in FIG. 11, a metal plate-bonded single cell unit 101 according to the third embodiment includes a metal separator 41 and a single cell element 103 bonded together by a rectangular frame-shaped bonding part 105 made of a brazing material as in the case of the first embodiment.

The single cell element 103 has a solid electrolyte layer 107, a fuel electrode layer 23 and an air electrode layer 25. The solid electrolyte layer 107 is smaller in longitudinal and lateral outer dimensions (as viewed in plan) than those of the first and embodiments, whereas the fuel electrode layer 23 and the air electrode layer 25 are similar to those of the first embodiment. Namely, an outer periphery of the solid electrolyte layer 107 is located slightly inside (by a distance of e.g. 0.5 to 4 mm) from an outer periphery of the single cell element 103.

In consequence, a bonding part 105 is formed such that the whole of a lower surface of the bonding part 105 is held in contact with an upper surface of the fuel electrode layer 23 and such that a part of a side surface of a lower portion of the bonding part 105 is held in contact with a side surface of the solid electrolyte layer 107 in the third embodiment.

The bonding part 105 includes a main bonding portion 109 on an upper side thereof and a Ti reaction phase 111 on a lower side thereof as in the case of the first embodiment. The Ti reaction phase 111 has a lower surface in contact with the upper surface of the fuel electrode layer 23 and a side surface in contact with the side surface of the solid electrolyte layer 107.

It is thus possible in the third embodiment to obtain the same effects as in the first embodiment. Further, it is advantageously possible in the third embodiment to ensure the higher bonding strength than in the second embodiment as the brazing material has a larger area of contact with the fuel electrode layer 23.

EXPERIMENTS

Next, an explanation will be given of experiments conducted to verify the effects of the present invention.

a) Experiment 1

Figure 12:
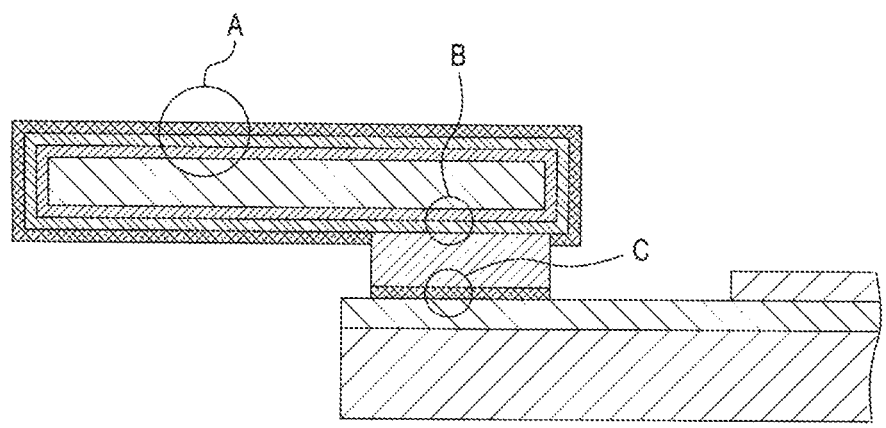
FIG. 12 is an enlarged section view of a bonding part and its vicinity of a metal plate-bonded single cell unit used in each experiment, showing observation points A to C.

In Experiment 1, a metal plate-bonded single fuel cell unit similar to that of the first embodiment as shown in FIG. 12 was produced as a test specimen.

Figure 13A:
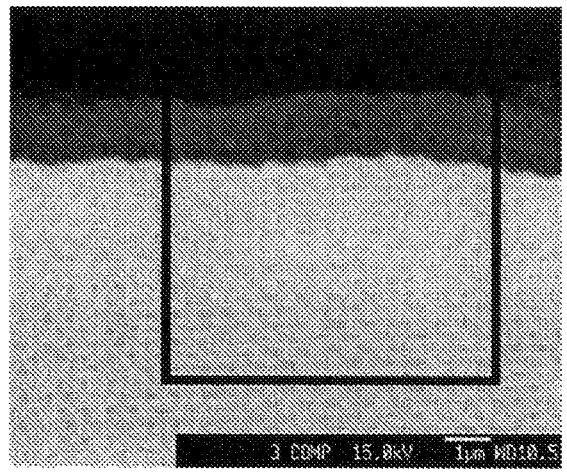
FIG. 13A is a SEM image of the metal plate-bonded single cell unit taken at observation point A in Experiment 1.
Figure 13B:
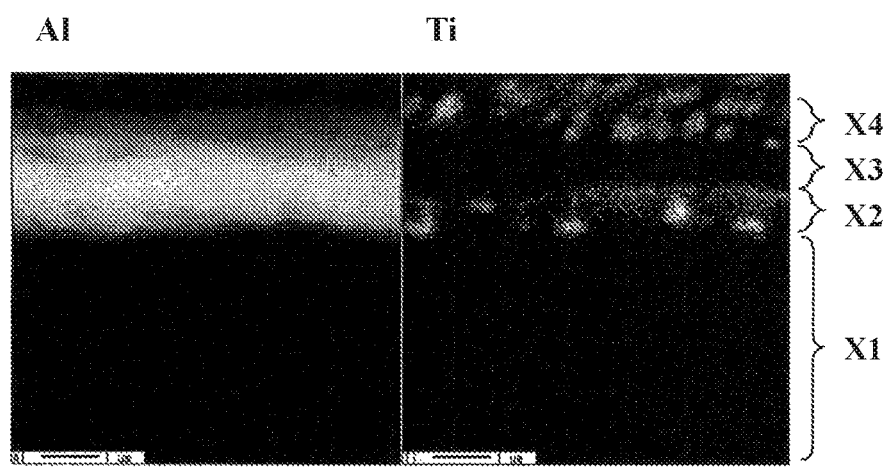
FIG. 13B is EPMA elemental mapping images of the metal plate-bonded single cell unit taken at observation point A in Experiment 1.

A sample was cut out from the test specimen at position A of FIG. 12 by CP (cross section polisher) processing. A SEM image and an EPMA elemental mapping image of this sample were obtained by known techniques. The resulting SEM image and EPMA elemental mapping images are shown in FIGS. 13A and 13B, respectively.

Samples were cut out from the test specimen at positions B and C of FIG. 12 by FIB (focused ion beam) processing. TEM images and EDX elemental mapping images of these samples were obtained by known techniques.

Figure 14A:
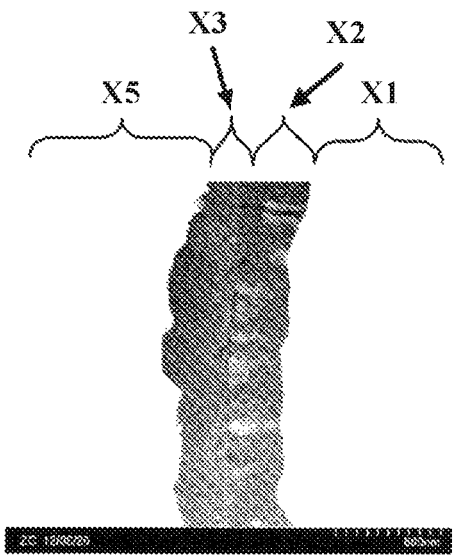
FIG. 14A is a TEM image of the metal plate-bonded single cell unit taken at observation point B in Experiment 1.
Figure 14B:
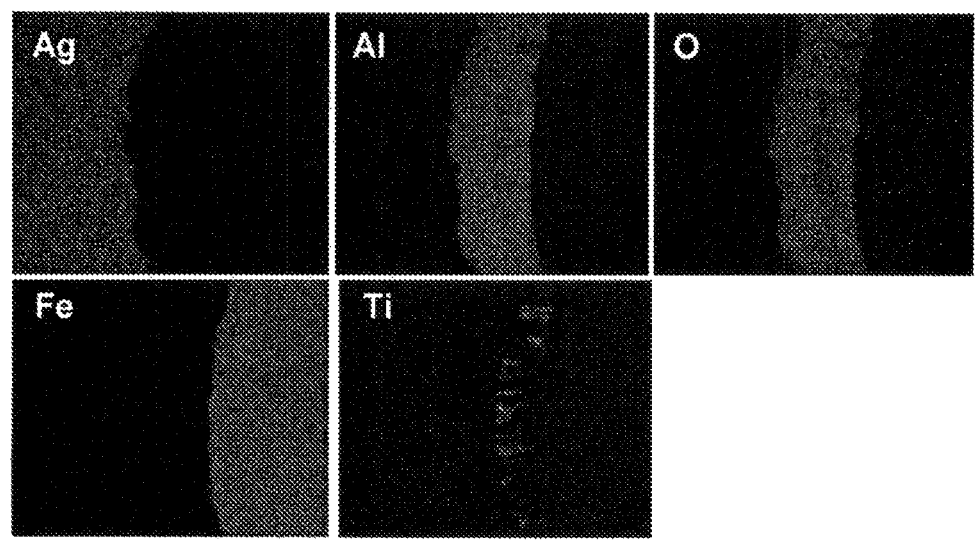
FIG. 14B is EDX elemental mapping images of the metal plate-bonded single cell unit taken at observation point B in Experiment 1.

The resulting TEM image and EDX elemental mapping image of the sample at position B are shown in FIG. 14A and FIG. 14B, respectively. The resulting TEM image and EDX elemental mapping image of the sample at position C are shown in FIGS. 15A and 15B, respectively.

Figure 15A:
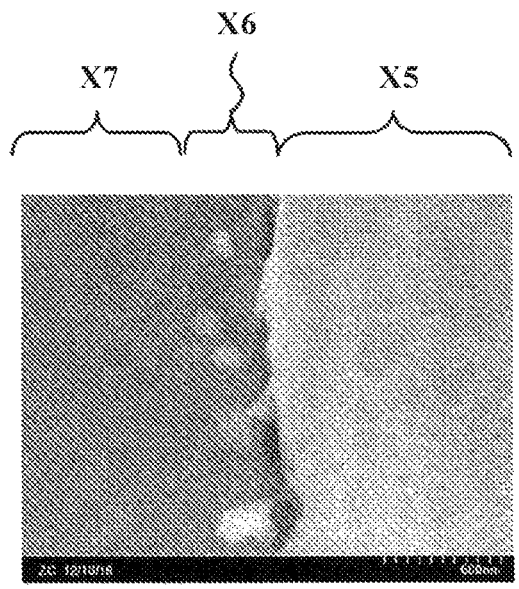
FIG. 15A is a TEM image of the metal plate-bonded single cell unit taken at observation point C in Experiment 1.
Figure 15B:
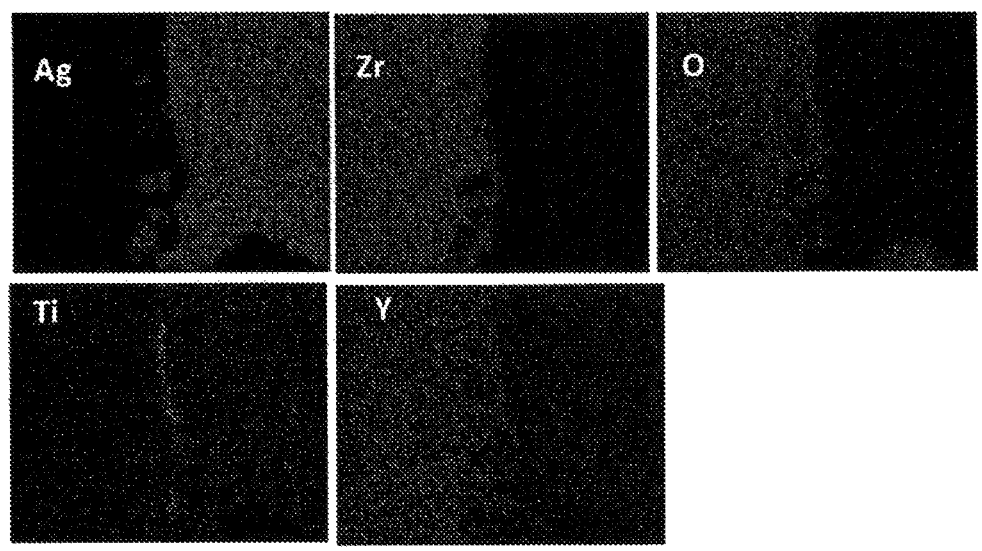
FIG. 15B is EDX elemental mapping images of the metal plate-bonded single cell unit taken at observation point B in Experiment 1.
Figure 16A:
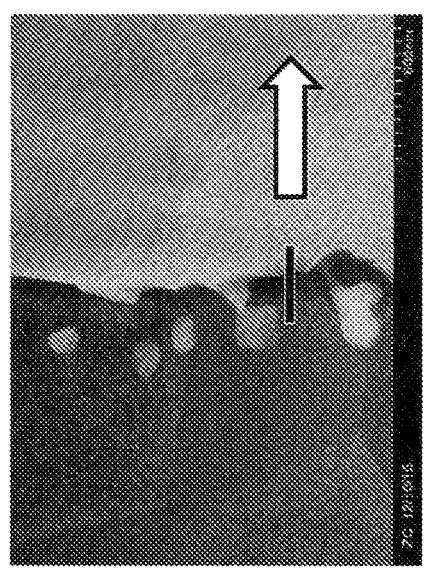
FIG. 16A is an EDX line analysis result of FIG. 15A.
Figure 16B:
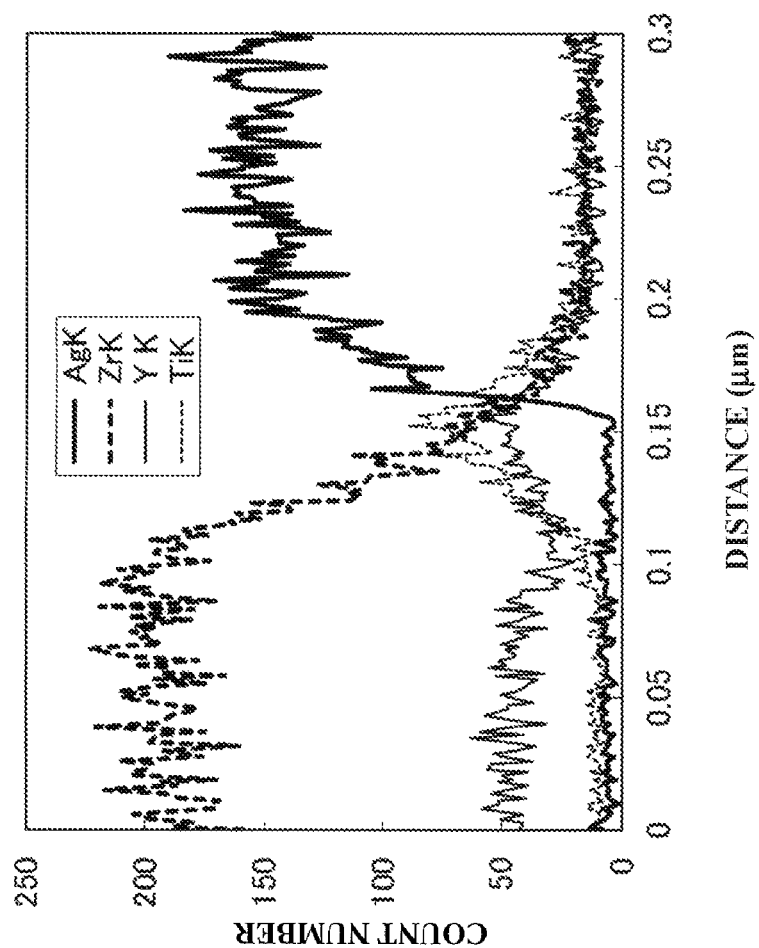
FIG. 16B is a graph showing the EDX line analysis result.

Further, EDX line analysis was performed on the measurement result of FIG. 15A by a known technique. The detailed position and direction of the EDX line analysis are shown by a black line and a white arrow in FIG. 16A. The result of the EDX line analysis (analysis result) is shown in FIG. 16B. Herein, the vertical axis and horizontal axis of FIG. 16B indicate a distance and a count number, respectively.

In FIGS. 13A to 15B, the existence of respective elements is indicated by white color.

As is apparent from FIGS. 13A and 13B, the heat-treated metal separator had a surface structure in which a Ti—Al-containing metal portion (X1), a Ti—Al-containing oxide layer (X2), an Al oxide film (X3) and a Ti-containing phase (X4) were present in this order from the center side.

As is apparent from FIGS. 14A and 14B, the Ti—Al-containing metal portion (X1), the Ti—Al-containing oxide layer (X2), the Al oxide film (X3) and an Ag braze bonding part (X5) were present, in this order from the upper side (right side in the figure), at an interface between the metal separator and the bonding part after the brazing. It is namely apparent that a part of the Ti-containing phase between the Al oxide film and the Ag braze bonding part disappeared. In each of FIGS. 14A and 14B, the right side corresponds to the upper side (metal separator side).

As is apparent from FIGS. 15A and 15B, the Ag braze bonding part (X5), a Ti reaction phase (X6) and the solid electrolyte layer (X7) were present, in this order from the upper side (right side in the figure), at an interface between the YSZ solid oxide layer (solid electrolyte layer) and the bonding part after the brazing. It is namely apparent that the Ti reaction phase was formed at the interface between the bonding part and the solid electrolyte layer. In each of FIGS. 15A and 15B, the right side corresponds to the upper side (metal separator side).

The formation of the Ti reaction phase at the interface is also apparent from the line analysis result of FIG. 16B. Further, the line analysis result showed a large amount of Y, but less amount of Zr, at the same position as Ti. This is assumed to be a trace of the reaction of Y in the solid electrolyte layer and Ti.

b) Experiment 2

In Experiment 2, four kinds of metal plate-bonded single fuel cell units were produced in the same manner as in Experiment 1 by using metal separator materials of different compositions (stainless steels of different Al and Ti contents).

More specifically, the following four kinds of metal separators were used for the metal plate-bonded single fuel cell units: (1) the metal separator containing 0.06 mass % of Ti and 3 mass % of Al, (2) the metal separator containing 1.0 mass % of Ti and 3 mass % of Al, (3) the metal separator containing 2 mass % of Al and 0.2 mass % of Ti and (4) the metal separator containing 10 mass % of Al and 0.2 mass % of Ti.

Each of the fuel cell units was tested for the surface structure in the same manner as in Experiment 1. It has been shown by the test results that the fuel cell units had surface structures similar to the above even though the respective layers were slightly different in thickness.

c) Experiment 3

In Experiment 3 various kinds of metal plate-bonded single fuel cell units were produced in the same manner as in Experiment 1 by changing the heat treatment temperature of the metal separator.

More specifically, the heat treatment temperature was set to 800° C., 900° C., 1000° C., 1100° C., 1200° C. or 1300° C. The other heat treatment conditions was set to be the same as those in Experimental Example 1.

Each of the fuel cell units was tested for the surface structure in the same manner as in Experiment 1. By the test results, it has been shown that the fuel cell units in which the metal separators were heat-treated at 900° C. to 1200° C. had surface structures similar to the above even though the respective layers were slightly different in thickness.

By contrast, no Al—Ti-containing oxide layer was formed in the fuel cell unit in which the metal separator was heat-treated at 800° C. In the fuel cell unit in which the metal separator was heat-treated at 1300° C., a layer of Ti was formed inside the Al—Ti-containing oxide layer.

d) Experiment 4

In Experiment 4, a metal plate-bonded single fuel cell unit similar to that of the first embodiment was produced and tested for the bonding strength (between the metal separator and the single cell unit).

A metal plate-bonded single fuel cell unit was produced as comparative example without heat treatment of a metal separator, and then, tested for the bonding strength. Similarly, metal plate-bonded single fuel cell units were produced by performing heat treatment on metal separators at 800° C. and 1300° C. and tested for the bonding strength.

The bonding strength was determined by lifting up and thereby peeling the metal separator from the single cell element (called "peel test"). The single cell unit of the present invention example had a high bonding strength of 5 N/mm$^2$. The single cell units of the comparative examples had a low bonding strength. The bonding strength was 2 N/mm$^2$ when the heat treatment was not performed. When the heat treatment was performed at 800° C., the bonding strength was 3 N/mm$^2$. The bonding strength was also 3 N/mm$^2$ when the heat treatment was performed at 1300° C.

The present invention is not limited to the above embodiments. Various changes and modifications of the above embodiments are possible within the scope of the present invention.

(1) For example, the configurations of the respective embodiments can be adopted in any possible combination thereof.

(2) The dimensions of the respective embodiments can be changed as appropriate within the scope of the present invention.

(3) Although the present invention is embodied as the flat plate type metal plate-bonded single fuel cell unit in each of the above embodiments, the present invention is applicable to a cylindrical type or flat cylindrical type metal plate-bonded fuel cell.

The invention claimed is:

1. A metal plate-bonded single fuel cell unit, comprising:
   a single cell element having a solid electrolyte, a fuel electrode disposed on one side of the solid electrolyte and an air electrode disposed on the other side of the solid electrolyte; and
   a metal plate bonded by a brazing material to the single cell element so as to be in contact with at least the solid electrolyte,
   wherein the metal plate contains 0.05 to 1 mass % of Ti and 2 to 10 mass % of Al based on a total mass of the metal plate, and has an Al—Ti-containing oxide layer present on a surface of the metal plate, an Al oxide film present on a surface of the Al—Ti-containing oxide layer and a Ti-containing phase apart from a part of a surface of the Al oxide film in contact with the brazing material while being present on a remaining part of the surface of the Al oxide film; and
   wherein the metal plate-bonded single fuel cell unit has a Ti reaction phase formed at an interface between the solid electrolyte and the brazing material.

2. The metal plate-bonded single fuel cell unit according to claim 1, wherein the metal plate serves as a separator to separate a space around the fuel cell from a space around the air electrode.

3. The metal plate-bonded single fuel cell unit according to claim 1, wherein the brazing material contains at least one kind selected from the group consisting of Ag, Au, Pd and Pt.

4. A fuel cell stack comprising a plurality of the metal plate-bonded single fuel cell units according to claim 1.

5. A method for producing the metal plate-bonded single fuel cell unit according to claim 1, comprising:
   bonding the metal plate to the single cell element by the brazing material; and
   before the bonding, heat-treating the metal plate in a temperature range of 900 to 1200° C.

\* \* \* \* \*